UNITED STATES PATENT OFFICE.

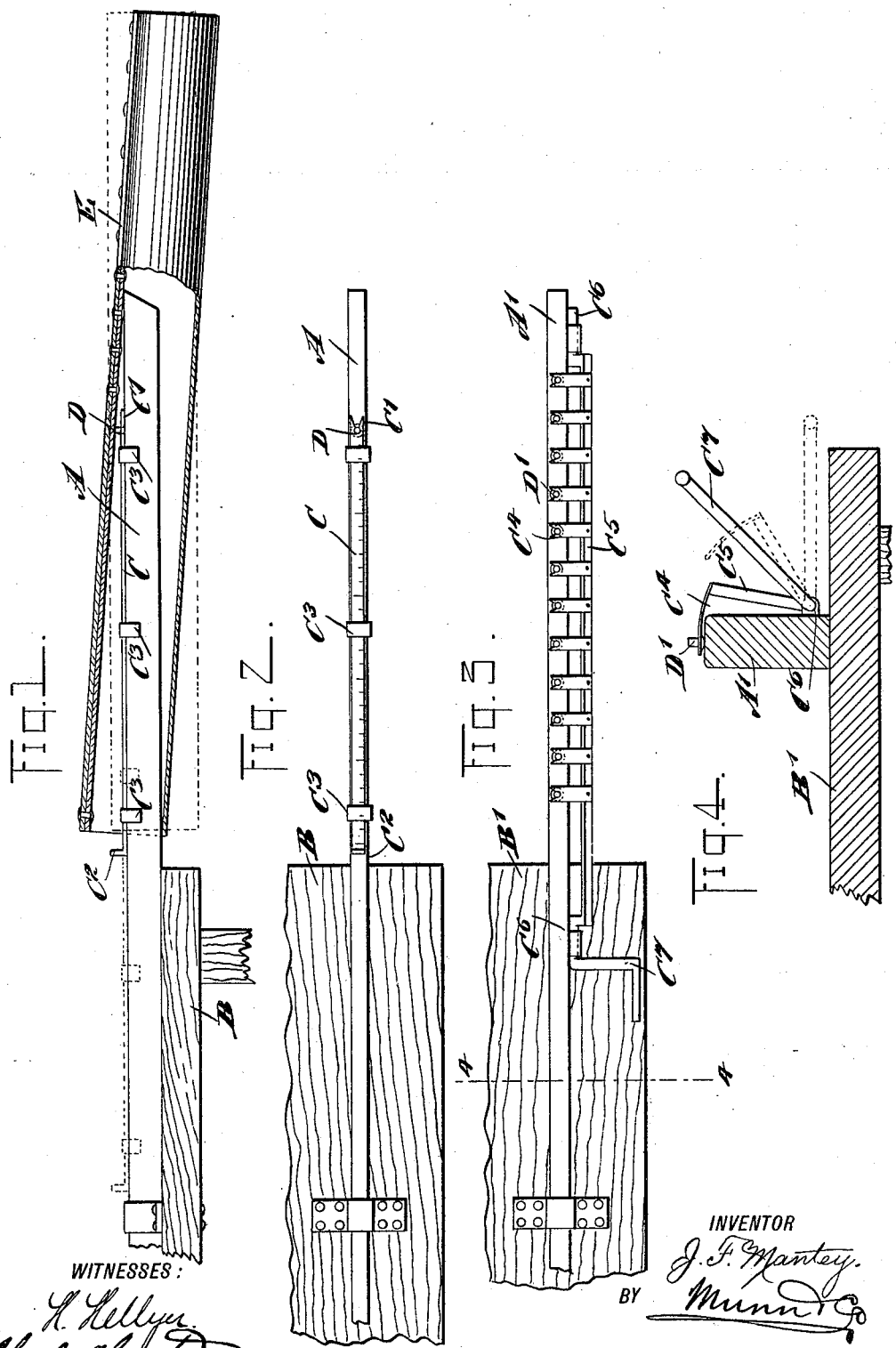

JOHN F. MANTEY, OF PATTERSON, TEXAS.

RIVETING-MANDREL.

SPECIFICATION forming part of Letters Patent No. 583,760, dated June 1, 1897.

Application filed November 6, 1896. Serial No. 611,258. (No model.)

*To all whom it may concern:*

Be it known that I, JOHN F. MANTEY, of Patterson, in the county of Waller and State of Texas, have invented a new and Improved Riveting-Mandrel, of which the following is a full, clear, and exact description.

The object of the invention is to provide a new and improved riveting-mandrel which is simple and durable in construction, and more especially designed for riveting the overlapping ends of sheet metal to form pipes, tubes, or the like.

The invention consists principally of an anvil-bar and a rivet-holder held movably on the said bar and adapted to temporarily hold the rivets in position for engagement with the openings in the parts to be riveted together.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement with a pipe in place and partly shown in section. Fig. 2 is a plan view of the improvement. Fig. 3 is a plan view of a modified form of the improvement, and Fig. 4 is an enlarged cross-section of the same on the line 4 4 of Fig. 3.

The improvement shown in Figs. 1 and 2 is provided with an anvil-bar A, secured on a bench or table B and projecting from one side thereof, as indicated in the drawings. The upper surface of the anvil-bar A is flat and unbroken, and fitted to slide longitudinally on the said upper surface of the bar is a rivet-holder C, formed at its outer end C', with a slot for receiving the head and part of the shank of the rivet D to be inserted in the registering apertures of the overlapping parts of the pipe, tube, or like device E to be riveted.

The inner end of the holder C, which is in the form of a bar, is formed with a handle $C^2$, adapted to be taken hold of by the operator to move the said holder longitudinally on the bar A. On the holder C are formed guides $C^3$, extending on the sides of the bar A, so as to guide the holder in its forward and backward movement on the bar A.

Now it will be seen that when the holder C is in an innermost position a rivet can readily be introduced at the end C', so that the under side of the head of the rivet rests on the top of the bar A, and the upper or outer end of the shank projects a suitable distance above the top of the holder. The holder C is now moved outward on the bar A to the desired position, and then the pipe or tube E is pushed over the end of the bar A, with the parts to be riveted overlapping, so as to bring the registering rivet-holes over the projecting end of the shank of the rivet, the pipe, tube, or the like being then bent downward to engage the said shank with the registering apertures. When this has been done, the operator pulls on the handle $C^2$, so as to draw the holder C inward and disengage the rivet which remains in the registering apertures of the parts to be riveted. The head of the rivet rests on the anvil and the shank extends through the parts to be riveted and is upset on the upper face of the latter in the usual manner. A new rivet is now inserted in the holder C, the tube E is slightly tilted with the outer end of the bar as a fulcrum, and then the holder is pushed outward, but not as far as formerly, so as to bring the new rivet to the next registering apertures.

In order to gage the amount of the outward movement of the holder C, I provide the latter on the top with a graduation corresponding to the distance the holes in the parts to be riveted are placed apart.

As shown in Figs. 3 and 4, the bar A' is secured on a bench B', and a series of rivet-holders $C^4$ extend transversely and are secured to a longitudinally-extending bar $C^5$, attached to a shaft $C^6$, mounted to turn in suitable bearings arranged on one side of the anvil-bar A'. A handle or crank-arm $C^7$ is secured on one shaft end to enable the operator to impart a swinging motion to the said shaft, so as to move the rivet-holders $C^4$ upon the top of the bar A' or away from the same during the time the parts are being riveted together. (See dotted lines in Fig. 4.) Each of the holders $C^4$ is formed at its end with a recess for the reception of a rivet D', the head of which rests on the top of the anvil-bar.

It will be seen that by the arrangement described a large number of rivets may be simultaneously supported on the top of the anvil-bar to engage the projecting ends of the shanks with the apertures in the overlapping parts to be riveted together. When this has been done, the crank-arm $C^7$ is swung downward to move the holders $C^4$ out of engagement with the rivets, and the latter may now be shifted in the usual manner.

Having thus fully described my invention, I claim as new and desire to secure by Letters Patent—

1. A riveting-mandrel, comprising an anvil-bar having a flat and unbroken upper surface, and a movable rivet-holder, said holder being adapted to be moved over the bar to bring a rivet in position to enter the openings in the parts to be riveted together and after the rivet has entered the openings to be disengaged therefrom and leave its head resting upon the anvil-bar ready to be riveted, substantially as described.

2. A riveting-mandrel, comprising an anvil-bar, and a swinging rivet-holder constructed and arranged to swing over upon the mandrel to permit the rivet to enter the openings in the parts to be riveted together, and then swung away from the same, substantially as described.

3. A riveting-mandrel, comprising an anvil-bar, and a plurality of rivet-holders pivotally supported at one side of the bar to be swung over upon the same, substantially as described.

4. In a riveting-mandrel, the combination with an anvil-bar, of a bar mounted in bearings on one side of the anvil-bar and provided with a handle at one end, and a plurality of rivet-holders secured to and projecting from said bar, substantially as herein shown and described.

JOHN F. MANTEY.

Witnesses:
  C. R. DE WITT,
  S. E. PALMER.